I. J. TRUE, DEC'D.
M. S. J. TRUE, ADMINISTRATRIX.
FILTER OR STRAINER.
APPLICATION FILED SEPT. 12, 1907.
926,038.
Patented June 22, 1909.
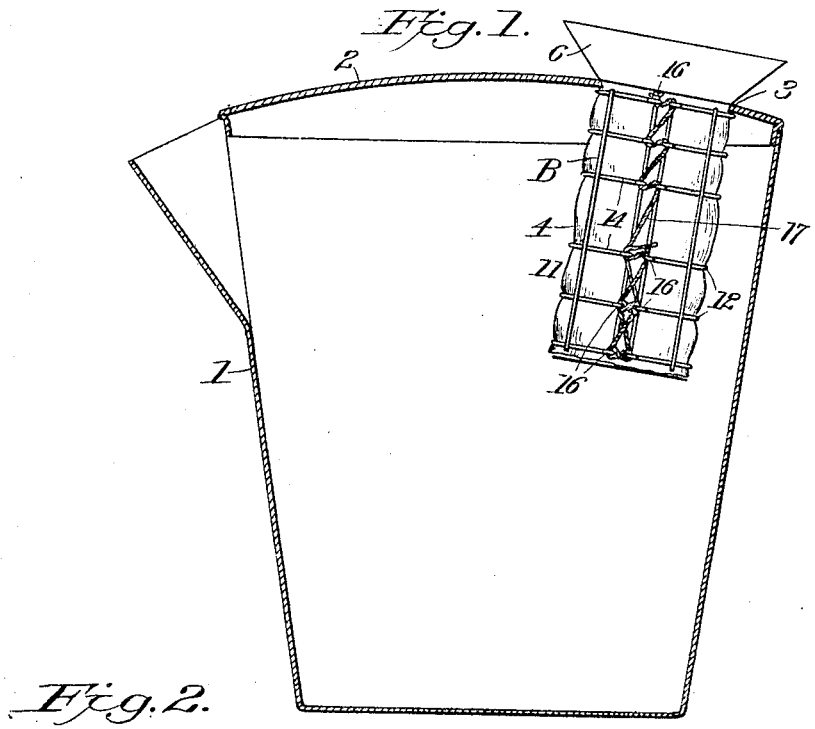
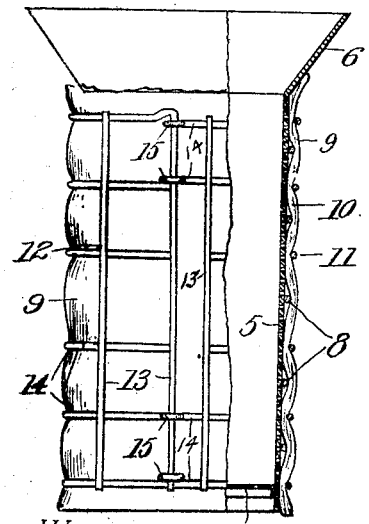
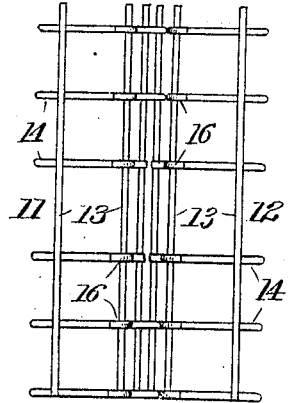
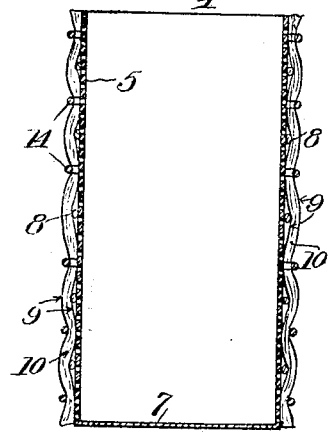
WITNESSES:
INVENTOR
Irving J. True,
by
Howard B. Berry,
Attorney

UNITED STATES PATENT OFFICE.

IRVING J. TRUE, OF PROVIDENCE, RHODE ISLAND; MARY S. J. TRUE ADMINISTRATRIX OF SAID IRVING J. TRUE, DECEASED.

FILTER OR STRAINER.

No. 926,038.  Specification of Letters Patent.  Patented June 22, 1909.

Application filed September 12, 1907. Serial No. 392,566.

*To all whom it may concern:*

Be it known that I, IRVING J. TRUE, a citizen of the United States, residing at Providence, in the county of Providence and State of Rhode Island, have invented certain new and useful Improvements in Filters or Strainers, of which the following is a specification.

This invention relates to filters or strainers.

One object of the invention is to provide a filter or strainer particularly adapted for use with relation to milk pails either for straining or filtering the milk after its precipitation into a milk pail or when milking.

Another object of the invention resides in the provision of a filter or strainer of the nature stated embodying such characteristics that the various elements embodied in its organization may be readily assembled or disassembled for cleaning purposes.

A still further object of the invention resides in the provision of a filter or strainer embodying in addition to the above and other features simplicity, inexpensiveness, durability and efficiency in its organization when all of the parts thereof are assembled for use.

With the above and other objects in view the present invention consists of the combination and arrangement of parts hereinafter more fully described, illustrated in the accompanying drawings, and particularly pointed out in the appended claims, it being understood that changes may be made in the form proportion size and minor details, without departing from the spirit or sacrificing any of the advantages of the invention.

In the drawings. Figure 1 is a view illustrating a milk pail in section and my improved filter or strainer in elevation. Fig. 2 is a vertical sectional view of the filter or strainer. Fig. 3 is a detailed view of the inclosing jacket. Fig. 4 is a vertical sectional view of the invention in one of its forms.

Referring now more particularly to the accompanying drawings the reference character 1 indicates a milk pail of any variety whose top or cover 2 is provided with an opening 3 for the insertion of my improved filter or strainer 4, the filter or strainer 4 in one form of the invention having its perforated shell portion 5 provided with a funnel shaped or flaring end 6 to facilitate the directing of the milk through the filter or strainer in the milking operation and to also insure a firm support for the filter or strainer within the pail 1 by virtue of the base of the funnel shaped or flaring end 6 engaging the periphery of the opening 3 of the pail 1, as clearly shown in Fig. 1. If preferred, and especially when the device is not intended for use in the manner just stated, the funnel shaped or flaring end of the shell 5 may be eliminated, as shown in Fig. 4. The device shown in this latter figure is used preferably for household purposes and for use in creamery or laboratory work and not during the milking operation, although obviously it may be used in the latter instance.

The filter or strainer consists of the inner shell 5 whose side walls are preferably perforated and whose bottom 7 is preferably non-perforated so that the milk will be strained through the sides of said shell. It will be seen that the bottom 7 is disposed slightly above the lower end of the shell and that the shell is reinforced by a series of circumscribing rings 8.

The reference character 9 indicates cheese cloth or other suitable material between which is disposed absorbent cotton or other suitable material 10. This cloth and absorbent material is adapted to be placed around the aforesaid shell 5 and it is held against displacement by means of a suitable jacket. This jacket is composed of two parts 11 and 12, which are preferably formed of wire or other suitable material and each including the vertical bars 13 and the horizontal bars 14, the two uppermost and the two lowermost horizontal bars 14 of the part 11 being extended beyond the innermost vertical bar 13 and formed into eyes 15 to embrace the innermost vertical bar of the part 12 of the jacket whereby said parts 11 and 12 may be hingedly connected together. The outer ends of all of the horizontal wires 13 of both parts 11 and 12 are extended beyond the outermost vertical bar of each part 11 and 12 and curved to provide hooks 16.

When the cheese cloth and absorbent material is placed around the cylinder 5 the jacket is closed upon its hinged connection around the cheese cloth and absorbent material, and a lacing cord 17 secured to the uppermost hook 16 of the part 11 is then interlaced in any suitable manner with all of the hooks 16 of both parts 11 and 12 to secure the jacket tightly about the device to prevent displacement of the cheese cloth and absorbent material and especially to prevent bunching of the absorbent material. The wire jacket thus has for its main object to not only hold the cloth and absorbent material in place but to also prevent bunching of the absorbent material and yet not interfere in the least with the percolation of the milk through the side walls of the inner cylinder or shell 5. By merely unlacing the cord 17 all of the parts may be quickly disassembled for cleaning or other purposes.

What is claimed is:—

1. In a filter or strainer, a perforated shell provided with a closed bottom, a hinged jacket to embrace said shell, means for fastening the jacket upon the shell, and absorbent material arranged between the shell and jacket.

2. In a filter or strainer, a shell provided with perforated walls, a wire jacket detachably secured to the shell, and flexible material between the shell and jacket.

3. In a filter or strainer, a perforated shell having reinforcing members embracing the shell, a wire jacket embracing the shell, and cheese cloth and absorbent material arranged between the shell and jacket.

4. In a filter or strainer, a perforated shell, a wire jacket surrounding the shell, and cheese cloth and absorbent material arranged between the shell and jacket.

5. In a filter or strainer, a perforated shell provided with a closed bottom, a wire jacket including hinged parts, each part including horizontal and vertical wires, the ends of the horizontal wires projecting beyond the outermost vertical wires of each hinged part and bent to form hooks, a lacing cord for engagement with said hooks of the said hinged parts to secure the jacket upon said shell, and flexible material arranged between the shell and jacket.

6. In a filter or strainer, a perforated shell provided with a closed bottom, a wire jacket including hinged parts, each part including horizontal and vertical wires, the ends of the horizontal wires projecting beyond the outermost vertical wires of each hinged part and bent to form hooks, a lacing cord for engagement with said hooks of the said hinged parts to secure the jacket upon said shell, and cheese cloth and absorbent material arranged between the shell and jacket.

7. In a filter or strainer, a perforated member, a member embracing the perforated member, said second member including wires, and flexible material arranged between said members.

8. In a filter or strainer, a perforated member, a member embracing the perforated member, said second member including wires, and cheese cloth and absorbent material arranged between said members.

9. In a filter or strainer, the combination with a receptacle provided with an opening in its top, of a filter or strainer comprising a perforated shell having a closed bottom, a jacket surrounding the shell, an absorbent material and a covering for the latter arranged between the shell and jacket, said shell having a flaring upper end to support the filter or strainer within said receptacle.

10. A filter or strainer comprising a perforated member, a jacket embracing said member, an absorbent material and a covering for the latter arranged between said member and jacket.

In testimony whereof I affix my signature, in presence of two witnesses.

IRVING J. TRUE.

Witnesses:
  JOHN NELSON,
  CHAS. T. REED.